(12) United States Patent
Kurtz et al.

(10) Patent No.: US 7,661,317 B2
(45) Date of Patent: Feb. 16, 2010

(54) HIGH PRESSURE TRANSDUCER HAVING AN H SHAPED CROSS-SECTION

(75) Inventors: Anthony D. Kurtz, Saddle River, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 279 days.

(21) Appl. No.: 11/825,089

(22) Filed: Jul. 3, 2007

(65) Prior Publication Data
US 2009/0007680 A1 Jan. 8, 2009

(51) Int. Cl.
*G01L 7/00* (2006.01)
(52) U.S. Cl. ........................................................ 73/714
(58) Field of Classification Search ........... 73/700–756; 361/283.1–283.4
See application file for complete search history.

(56) References Cited

U.S. PATENT DOCUMENTS

| | | | | |
|---|---|---|---|---|
| 3,358,511 A | * | 12/1967 | Bargen | 73/727 |
| 3,739,315 A | | 6/1973 | Kurtz et al. | |
| 3,772,628 A | * | 11/1973 | Underwood et al. | 338/4 |
| 4,116,075 A | * | 9/1978 | Ort | 73/708 |
| 4,133,100 A | * | 1/1979 | Myhre | 29/621.1 |
| 4,376,929 A | * | 3/1983 | Myhre | 338/4 |
| 4,406,993 A | | 9/1983 | Kurtz | |
| 5,614,678 A | | 3/1997 | Kurtz et al. | |
| 6,595,063 B1 | * | 7/2003 | Rogne et al. | 73/715 |
| 2009/0007682 A1 | * | 1/2009 | Kurtz et al. | 73/727 |

* cited by examiner

*Primary Examiner*—Lisa M Caputo
*Assistant Examiner*—Jermaine Jenkins
(74) *Attorney, Agent, or Firm*—Troutman Sanders LLP; James E. Schuts; Filip A. Kowalewski

(57) ABSTRACT

A high pressure transducer has an H shaped cross-section with a center arm of the H having a top and bottom surface with the top surface of the H accommodating four strain gauges. Two strain gauges are located at the center of the top portion of the center arm of the H and are positive strain gauges, while two strain gauges are located near the periphery of the center arm of the gauge. The bottom surface of the center arm of the gauge has an active area of a smaller diameter than the circular diameter of the center arm portion of the transducer. The smaller active area is surrounded by a thicker stepped area which surrounds an active area on the pressure side of the H shaped member. The surrounding stepped area enables one to position the two negative strain gauges on the opposite surface of the center arm and near the periphery to thereby cause the negative gauges to respond to a negative stresses and therefore to enable one to provide a full Wheatstone bridge which includes the two positive strain gauges located at the center of the center arm of the H and the two negative peripheral gauges.

19 Claims, 2 Drawing Sheets

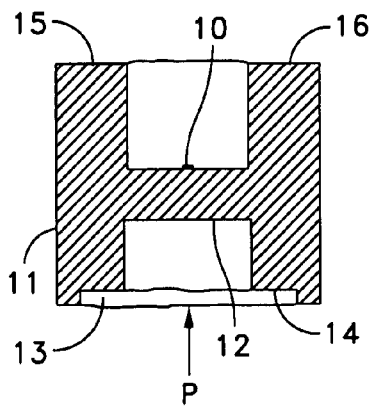
FIG. 1
(PRIOR ART)
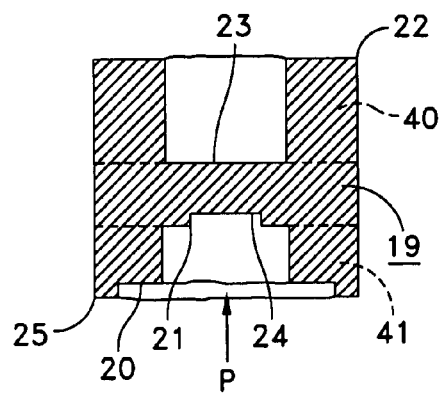
FIG. 2A
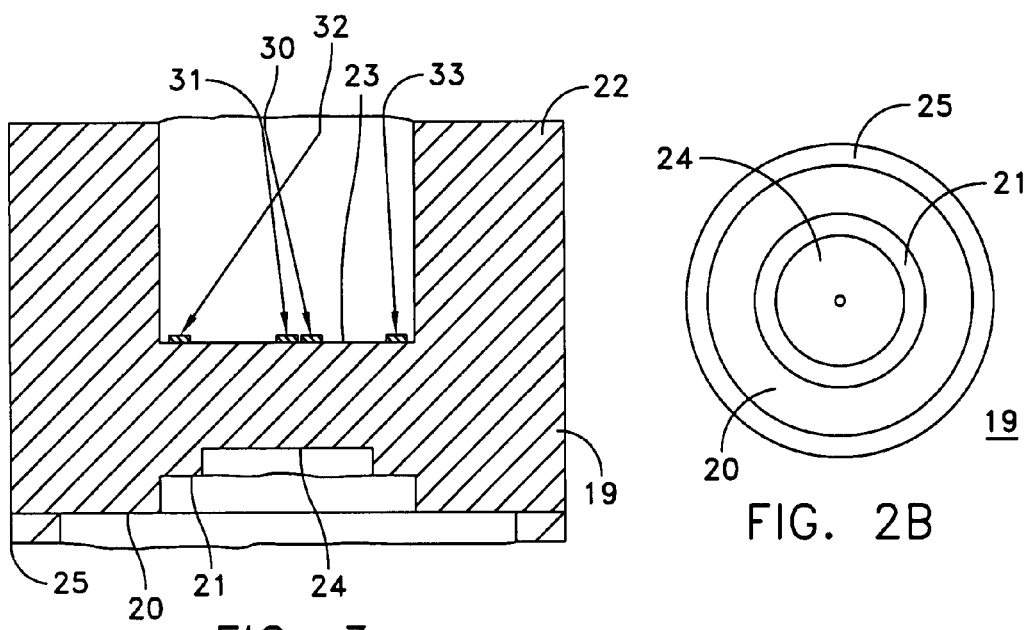
FIG. 2B
FIG. 3

HIGH PRESSURE TRANSDUCER HAVING AN H SHAPED CROSS-SECTION

FIELD OF THE INVENTION

This invention relates to pressure transducers and more particularly to a pressure transducer capable of measuring very high pressures.

BACKGROUND OF THE INVENTION

The prior art is filled with numerous examples of pressure transducers. Diaphragm based pressure transducers convert applied pressure into stresses in the plane of the diaphragm. These stresses can be conveniently measured and converted into electrical signals by the use of piezoresistive sensors or other strain gauge devices which are mounted on or which are part of the diaphragm. A common arrangement is that of a clamped edge diaphragm wherein the outer portion of the diaphragm is fixed and a central region deflects under applied pressure. In conventional terminology the central region which constitutes a diaphragm region is referred as the active region. In a conventional clamped diaphragm, the stress on the surface of the diaphragm varies from a maximum tensile stress at the clamped edges to a maximum compressive stress in the center of the diaphragm. Such diaphragms can be made of metal to which sensors are cemented or in other cases from a semiconductor material such as silicon on which the sensors are either embedded or affixed.

The operation of such diaphragms as well as the stresses that incur in such diaphragms have been widely explained. See for example, U.S. Pat. No. 5,614,678, entitled "High Pressure Piezoresistive Transducer", issued Mar. 25, 1997 to A. D. Kurtz et al. an inventor herein and assigned to Kulite Semiconductor Products, Inc., the assignee herein. Many prior art pressure transducers utilize metal diaphragms where the sensors are cemented or otherwise secured to the metal diaphragms. Such devices are capable of operating at extremely high pressures. For example, such pressures can be between 15,000 and 30,000 psi or higher. Other devices in the prior art show high pressure transducers which incorporate metal diaphragms whereby the transducer is an oil filled pressure transducer. See for example U.S. Pat. No. 4,406,993, entitled "Oil Filled Pressure Transducer" issued on Sep. 27, 1983, to A. D. Kurtz and assigned to the assignee herein.

Thus, as one can ascertain from the prior art there are employed high pressure transducers which utilize metal diaphragms. There transducers are capable of operating at extremely high pressures, but such pressures of operation are below about 60,000 psi. Pressure measurements at or above about 60,000 psi provide a problem in regard to operation. At such high pressures when employing a metal diaphragm, the diaphragm thickness increases considerably. In fact, the diaphragm becomes so thick that it can only respond to positive stresses and therefore only positive strain gauges can be employed. With only positive stresses, only a half-bridge design can be utilized. A half-bridge consists of two piezoresistors whereby fixed resistors can also be employed to complete a full Wheatstone bridge. In any event, a half-bridge has significant losses in output and accuracy. The prior art, when operating at such high pressure required the use of only a half bridge design, thus resulting in lower accuracy and lower output.

The prior art also used transducers and diaphragm constructions which basically had an H shape cross-sectional configuration. Such a configuration has certain advantages in regard to handling as well as mounting of the device. See for example, U.S. Pat. No. 3,739,315, entitled "Semiconductor Transducer Having H Shape Cross-sectional Configuration" by A. D. Kurtz et al. and assigned to Kulite Semiconductor Products, Inc., the assignee herein, and issued on Jun. 12, 1973.

SUMMARY OF THE INVENTION

A pressure transducer structure for high pressure operation, comprising a transducer structure having an "H" shaped cross-section and fabricated from a metal, with the center arm of the H having a top and bottom surface, with one of the surfaces having a flange framing diaphragm area on the surface, with the other surface of the center arm providing a strain gauge mounting surface.

BRIEF DESCRIPTION OF THE FIGURES

FIG. 1 is a cross-sectional view of a prior art metal housing for a high pressure transducer.

FIG. 2 consists of FIGS. 2A and 2B, wherein FIG. 2A is a cross-sectional view of a transducer housing for a high pressure transducer according to an embodiment of this invention.

FIG. 2 B is a top plan view of the pressure input side of the transducer in FIG. 2A.

FIG. 3 is a cross-sectional view showing a pressure transducer incorporating negative and positive strain gauges for providing a Wheatstone bridge configuration.

DETAILED DESCRIPTION OF THE INVENTION

Figure 4:
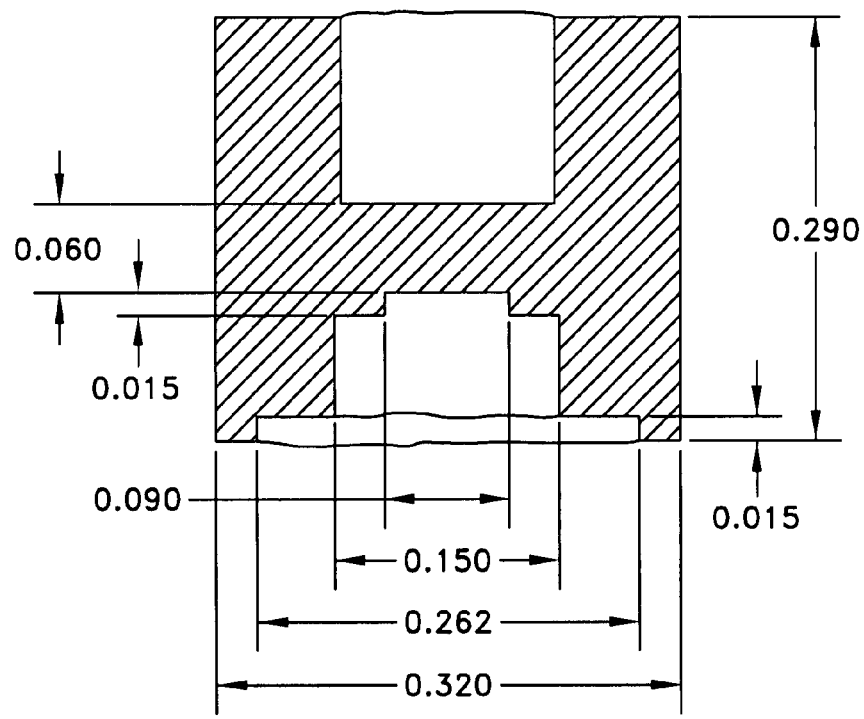
FIG. 4 depicts a transducer according to an embodiment of the invention showing typical dimensions for a unit capable of operating at 60,000 psi.

Referring to FIG. 1 there is shown a prior art H shape cross-sectional transducer. As indicated previously, such a device as shown in FIG. 1 has a very thick diaphragm area 12. The entire device is fabricated from a metal such as stainless steel with the diaphragm area 12 being the active area. Because the diaphragm is relatively thick for measuring high pressures, the diaphragm can only respond to positive stresses. Therefore, at the center of the diaphragm, or near the center of the diaphragm, there are positioned two gauges indicated by reference numeral 10. The gauges are wired in a half-bridge configuration and provide less than desirable accuracy and lower output for applied pressures. The prior art configuration can not provide a full Wheatstone bridge configuration which can sense positive and negative stresses because the thick diaphragm results in only positive stresses.

As one can see, the transducer shown in FIG. 1 basically has an H shaped configuration with the center arm of the H being the active area. The ends of the H such as designated by reference numeral 13 and 14 provided a mounting surface for the device. The device could be mounted via arms 15 and 16, thereby isolating the two gauges from the pressure environment. As can be seen in FIG. 1 pressure (P) is applied to the underside of the diaphragm and therefore the gauges as 10 are isolated from the environment producing the pressure. The gauges 10 which are typically silicon piezoresistor gauges are secured to the metal H shape member 11 by means of a suitable bond. The bond could include an epoxy/or a glass bond or some other bond which would enable one to secure the gauges to the active area 12 of the H shape member 11. The H shape member 11, as shown in FIG. 1, was typically fabricated from a metal such as stainless steel or some other metal which would be non-corrosive. It is also understood that the cross-sectional H shape transducer 11 as depicted in FIG. 1 normally is of a circular configuration, although any geometrical configuration can be employed as well. Such circular configurations for transducers are well known in the art.

Referring to FIG. 2, which consists of FIGS. 2A and 2B, there is shown in FIG. 2A a cross-sectional view of an H shape transducer according to an exemplary embodiment of this invention. As seen the transducer configuration 19 of FIG. 2A includes a step portion 21, which essentially surrounds the active area 24. Thus, the active area 24 is smaller than the active area 12 of the prior art device. This smaller diameter is on the pressure receiving side. By including the step 21 and the smaller diameter active area 24, one now can obtain negative stresses at the edges of the diaphragm area 24. The step 21 which surrounds the active area 24 provides a thicker outer edge which enables the diaphragm to produce negative stresses at the periphery. The diaphragm surface 23 includes a greater gauge diameter with the step 21 being on the pressure side which reduces the pressure side diameter. The step section 21 enables negative stresses to be provided at the periphery of diaphragm area 24. By measuring the strain, one can obtain an electrical output proportional to the high pressures experienced by the diaphragm. The electrical output is the result of a full Wheatstone bridge configuration. Thus, as will be indicated, the gauge side contains four gauges, two of which respond to negative stress and two of which respond to positive stress. These gauges can be wired into a full Wheatstone bridge thereby increasing output and accuracy. Such bridge configurations are well known. The gauges are glassed or otherwise secured to the diaphragm section.

As seen in FIG. 2B, there is shown a top plan view of the device in FIG. 2A looking in from the pressure side. As seen, there is a central active area 24 which is surrounded by a stepped concentric rim 21. There is shown the top section 20 and the outer section 25. The sections 20 and 25 provide a face seal area for the device. It is noted that the flange 25 can be omitted as on the arms of the H. Thus, the device can be a planar member having a flat top and a bottom stepped area as 21 and 24. This configuration is shown by the dashed lines in FIG. 2A. One would clamp the diaphragm by using a cup member as 40 surrounding the area 23. Thus, area 24 is again smaller than area 23. An additional member as 41 can also be welded to the planar member. Essentially as can be seen from FIG. 2A the "H" shaped transducer configuration 19 can be formed of multiple metal parts which can be welded together.

Referring to FIG. 3, there is shown the H shape transducer 19, with gauges positioned on the gauge side. As one can ascertain from FIG. 3, there are two gauges positioned about the center of the active area 24 and on the gauge side 23. Gauges 30 and 31 are both positive operating strain gauges. Overlying the step portion 21 which surrounds the active area, are gauges 32 and 33. These gauges are negative strain gauges. Thus, gauges 30, 31, 32 and 33 can be wired as a conventional Wheatstone bridge to enable one to obtain greater output as well as greater accuracy. The full Wheatstone bridge on the H shaped transducer responds to pressures up to 60,000 psi, with a larger output and accuracy. The utilization of a full bridge as indicated, increases accuracy and output as compared to the half bridge shown in FIG. 1.

Referring to FIG. 4, there is shown the typical dimensions of the transducer device 19 depicted in FIGS. 2A and 2B. The device with the exemplary dimensions can measure pressures up to 60,000 psi and greater. This is because of the fact that one can utilize positive and negative gauges as shown in FIG. 3 and utilize these gauges as a full Wheatstone bridge array.

Figure 5:
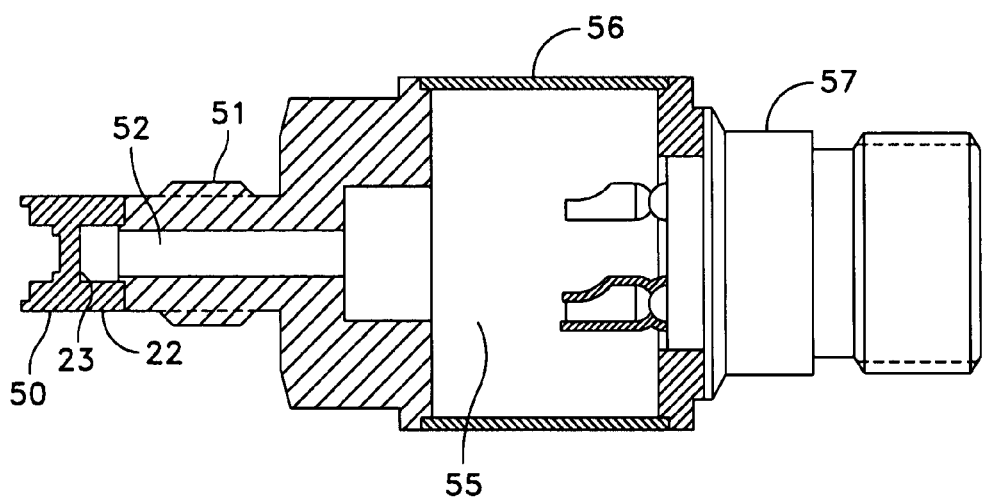
FIG. 5 shows a cross-sectional view of a housing which incorporates an H shaped transducer, according to an embodiment of the invention.

Referring to FIG. 5, there is shown a typical pressure sensor utilizing the diaphragm and structure of FIG. 2A and FIG. 3, mounted on a suitable housing. The stepped device as depicted in FIG. 3 is mounted at the front end of the pressure device of FIG. 5. The H shaped header 50 is depicted with members 22 or the top legs of the device welded to a front section 51 of the pressure sensor. There is shown a passageway 52 which accommodates the wires from the H shaped transducer 50. As seen in FIG. 5, the gauges which are either glassed or secured to surface 23 are not shown, but the gauges would be wired in a Wheatstone bridge configuration and the leads from the Wheatstone bridge would be directed into passageway 52. There is shown a section 51 which is threaded. There is an internal hollow 55 which would accommodate electronics utilized together with the Wheatstone bridge to provide suitable pressure outputs and bridge compensation. The hollow 55 can contain compensation electronics as well as other electronics for the unit. The body 56 has an internal hollow to enable the insertion of suitable compensation or electronics and so on. Coupled to the back end of the pressure sensor is a connector 57. The connector 57 has terminals which enable one to interface with the Wheatstone bridge on the H shaped header 50.

In FIG. 4, the dimensions given are utilized for a pressure sensor of an H shaped configuration which is capable of measuring pressures up to 60,000 psi. The device is conventionally fabricated from stainless steel or from one other non-corrosive metal as can be determined by one skilled in the art. Thus, there is described a thick metal H shaped cross-sectional configuration, which is capable of measuring pressures to 60,000 psi and utilizing a full Wheatstone bridge array to obtain increased output and increased accuracy. It will become apparent to those skilled in the art that there may be alternative embodiments which are included herein.

Such alternative embodiments would include for example, the elimination of certain arms of the H shape member to produce a cup like member also capable of measuring extremely high pressures, but without having arms 22 for securing to a housing. Thus, the arms 22 can be eliminated and the pressure transducer can be mounted to a surface based on the underlying outer portion of the gauge area 23 which will be referred to as the non-active area. This non-active area would be the area that would be connected or coupled to an external header. As indicated above, Kulite Semiconductor Products, Inc. has many patents which show a central active area with peripheral non-active areas or clamping areas.

These are all deemed part of the prior art and one skilled in the art can therefore make modifications to the devices depicted herein without departing from the spirit and scope of the claims appended hereto.

What is claimed is:

1. A pressure transducer structure for high pressure operation, comprising:

a transducer structure having an "H" shaped cross-section and fabricated from a metal, with the center arm of said H having a top and bottom surface, with one of said surfaces having a step portion within said surface, said step portion forming a thin center area, with said other surface of said center arm opposite said center area providing a strain gauge mounting surface, further including a first and second positive stress sensing gauge positioned on said strain gauge mounting surface within the said thin center area of said surface and a third and fourth negative strain sensing gauge with one of said negative gauges positioned outside the center area of said gauge mounting surface at a first location and positioned above said flange on said opposite surface and with said fourth gauge positioned outside the center area of said gauge mounting surface at a second location opposite said first location.

2. The pressure transducer structure according to claim 1, wherein said metal is stainless steel.

3. The pressure transducer structure according to claim 1, wherein said first, second, third and fourth gauges are piezoresistive strain gauges.

4. The pressure transducer structure according to claim 3, wherein said piezoresistive strain gauges are silicon gauges.

5. The pressure transducer structure according to claim 1, wherein said first, second, third and fourth gauges are connected in a full Wheatstone bridge array.

6. The pressure transducer structure according to claim 5, wherein a pressure to be monitored is applied to said surface having said flange.

7. The pressure transducer structure according to claim 1, wherein said transducer structure is generally circular with said center arm of said H being circular and having a circular top and bottom surface of the same diameter, with said flange being a circular peripheral flange surrounding a circular diaphragm area on one side of said surfaces to create an active area of a smaller diameter than said same diameter.

8. The pressure transducer structure according to claim 7, wherein the height of said flange is about one tenth the diameter of said surrounded area.

9. The pressure transducer structure according to claim 1 for measuring pressures relatively up to 60,000 psi.

10. A pressure transducer comprising:
a planer member having a top and a bottom surface and having a central uniform, depth depression on one of said surfaces defining a pressure receiving area, said depression surrounded by a first peripheral flange of a given width,
first and second strain gauges positioned on said opposite surface near the center of said depression with third and fourth gauges positioned on said opposite surface, with said third gauge positioned on said surface overlying said flange on a first side of said depression and said fourth gauge overlying said flange on a second side, opposite said first side, of said depression, with said first and second gauges responsive to positive stresses and with said third and fourth gauges responsive to negative stresses.

11. The pressure transducer according to claim 10, wherein said planar member is fabricated from a metal.

12. The pressure transducer according to claim 11, wherein said metal is stainless steel.

13. The pressure transducer according to claim 10, wherein said surface containing said gauges has peripheral flange surrounding said gauges.

14. The pressure transducer according to claim 13, further including a second peripheral flange surrounding said first flange wherein said pressure transducer has an H shaped cross-section.

15. The pressure transducer according to claim 14, wherein said planar member, said flanges and said surfaces are all circular in configuration.

16. The pressure transducer according to claim 10, wherein said first, second, third and fourth gauges are connected in a Wheatstone bridge array.

17. The pressure transducer according to claim 10, wherein said gauges are piezoresistive gauges.

18. The pressure transducers according to claim 17, wherein said gauges are silicon.

19. The pressure transducer according to claim 10, wherein said pressure transducer is operative to receive pressure of a magnitude up to at least 60,000 psi.

* * * * *